United States Patent [19]
Warn et al.

[11] Patent Number: 5,663,887
[45] Date of Patent: *Sep. 2, 1997

[54] DISPENSER CONTROL CONSOLE INTERFACED TO A REGISTER

[75] Inventors: Walter E. Warn, Knightdale; Fred K. Carr, Chapel Hill, both of N.C.

[73] Assignee: Progressive International Electronics, Raleigh, N.C.

[*] Notice: The term of this patent shall not extend beyond the expiration date of Pat. No. 5,394,336.

[21] Appl. No.: 583,895

[22] Filed: Jan. 11, 1996

[51] Int. Cl.⁶ .................................... G06F 17/00
[52] U.S. Cl. ............... 364/479.02; 364/479.06; 364/479.11; 705/21
[58] Field of Search .................. 364/479.01, 479.02, 364/479.06, 479.07, 479.08, 479.09, 479.1, 479.11, 479.12, 465, 131–135, 405, 509, 510; 340/825.35; 222/14, 23–28; 395/216–218, 220–222

[56] References Cited

U.S. PATENT DOCUMENTS

| | | | |
|---|---|---|---|
| 5,270,943 | 12/1993 | Warn | 364/479 |
| 5,361,216 | 11/1994 | Warn et al. | 364/510 |
| 5,394,336 | 2/1995 | Warn et al. | 364/479 |
| 5,557,529 | 9/1996 | Warn et al. | 364/479.02 |

*Primary Examiner*—Reba I. Elmore
*Assistant Examiner*—Thomas Brown
*Attorney, Agent, or Firm*—Fred K. Carr

[57] ABSTRACT

The present invention relates to a fuel dispenser control console which is interfaced to a cash register for downloading sales information to the register when the sale is paid out on the console. The control console includes a programmable data processor which processes commands for controlling the dispensers. Commands to the dispensers are initiated through input keys on the console. Sales information is down-loaded to the cash register through a serial connection to the console. Sales information is transferred from the console to the register in a command format (character string) which mimics a cash register keyboard entry. The system uses a communication protocol translator to configure the command logic signals from the console into a format readable by the dispensers such that the system can be used with various dispenser brands.

14 Claims, 4 Drawing Sheets

DISPENSER CONTROL CONSOLE INTERFACED TO A REGISTER

RELATED PATENTS

U.S. patent entitled "Fuel Pump Control Card" filed Jan. 3, 1992 bearing the U.S. Pat. No. 5,270,943, Walter E. Warn inventor, and U.S. patent entitled "Fuel Dipenser-Cash Register Control Console" filed Jul. 28, 1993, bearing U.S. Pat. No. 5,394, 336, Walter E. Warn and Fred K. Carr inventors, both assigned to Progressive International Electronics.

FIELD OF THE INVENTION

The present invention relates to a device and method for controlling fuel dispensers, and more particularly, to a fuel dispenser-cash register control console which controls fuel dispensers and down-loads fuel sales information to a cash register when the sale is paid out on the console.

BACKGROUND OF THE INVENTION

Fuel dispensers are often controlled by a dispenser controller operated by a store clerk located in a building where other items are available for sale. The dispenser controller has a wire connection to the dispensers for transferring data signals for controlling and monitoring the dispensing process. The controller sends command signals to the dispensers including price per gallon of the fuel to be dispensed, preset limits of fuel to be dispensed, and pump authorization. The dispensers, in turn, send response signals to the controller including pump number, pump status, and dispensed fuel volume and value.

U.S. Pat. No. 5,270,943 issued to Walter E. Warn, and assigned to Progressive International Electronics, relates to a fuel pump control card which is a dispenser control device inserted in an expansion slot of a PC for controlling electronic dispensers. Electronic dispensers have a built-in processor for calculating and displaying the volume and dollar value of the fuel dispensed. A microprocessor on the fuel pump control card communicates with the processor in the dispenser for controlling the dispensers. U.S. Pat. No. 5,394, 336 issued to Walter E. Warn and Fred K. Carr, and assigned to Progressive International Electronics, relates to a fuel dispenser-cash register control console for simultaneously controlling fuel dispensers and the input key switches on a cash register keyboard such that certain sales information on the dispensing process can be transferred to the cash register. This system includes a printed circuit board with processor which is installed in the cash register and connected to the register key control board. When the processor receives sales information from the console, it locks out the cash register keyboard, transfers the information, and then unlocks the keyboard.

There are advantages to down-loading fuel sales at the end of the fueling transaction into a cash register or Point-of-Sales system. When an attendant reads sales information from a control console and transfers it to a cash register, he may mis-key the information or intentionally enter false information. Automatically down-loading sales information from the dispenser controller to the cash register prevents this.

In brief, the present invention provides for a fuel dispenser-cash register control console which rings fuel transactions into a cash register when the sale is paid out on the console. The microprocessor MP in the console is serially connected to the MP in the cash register. When the sale is paid out on the console, it sends a character string to the cash register which mimics an entry by an attendant on the keyboard of the cash register. The amount of the fuel sale is posted in a designed department the same as if the attendant had entered the dollar amount of the transaction and the department number on the register keyboard.

While the present invention has some features similar to the device and method disclosed in U.S. Pat. No. 5,394,336, it provides several improvements. Mainly with the present invention, a second circuit board does not have to be installed in the cash register for taking control of the keyboard. With the present invention, commands containing sales information are transferred directly from the MP in the console to the MP in the register.

SUMMARY OF THE INVENTION

In summary, the present invention relates to a fuel dispenser-cash register control system for controlling fuel dispensers and down-loading sales information on each dispensing transaction to a cash register when the sale is paid out on the console. The system includes a control console having a programmable data processor coupled with a read-only-memory ROM chip and read-and-write-memory RAM chip. The commands for controlling the dispensers during the fueling process are stored in the ROM, and responses from the dispensers during the fueling process are processed and stored in the RAM. Commands to the dispensers are initiated through input keys on the console. Sales information is down-loaded to the cash register having a second microprocessor with ROM and RAM, serially connected to the processor in the console. Sales information is transferred from the console to the register in a command format (character string) which mimics a keyboard entry. The system utilizes a communication protocol translator for configuring the command logic signals from the console into a communication protocol readable by the dispensers, and the responses from the dispensers into logic signals readable by the microprocessor in the pump controller, such that the system can be used with various dispenser brands.

Accordingly, the primary object of this invention is to provide a fuel dispenser-cash register control system for controlling various dispenser brands.

A further object of the present invention is to provide a dispenser-cash register control console which has an application interface for down-loading fueling transactions to a cash register when the transaction is paid out on the console.

A further object of the present invention is to provide a dispenser control console which stores fuel sales information which can be down-loaded to a printer.

A further object of the present invention is to provide a dispenser control console which stores fuel sales information which can be down-loaded to a PC.

BRIEF DESCRIPTION OF THE DRAWINGS

Other objects of this invention will appear in the following specification and claims, reference being made to the accompanying drawings which form a part thereof.

DETAILED DESCRIPTION OF THE INVENTION

Figure 1:
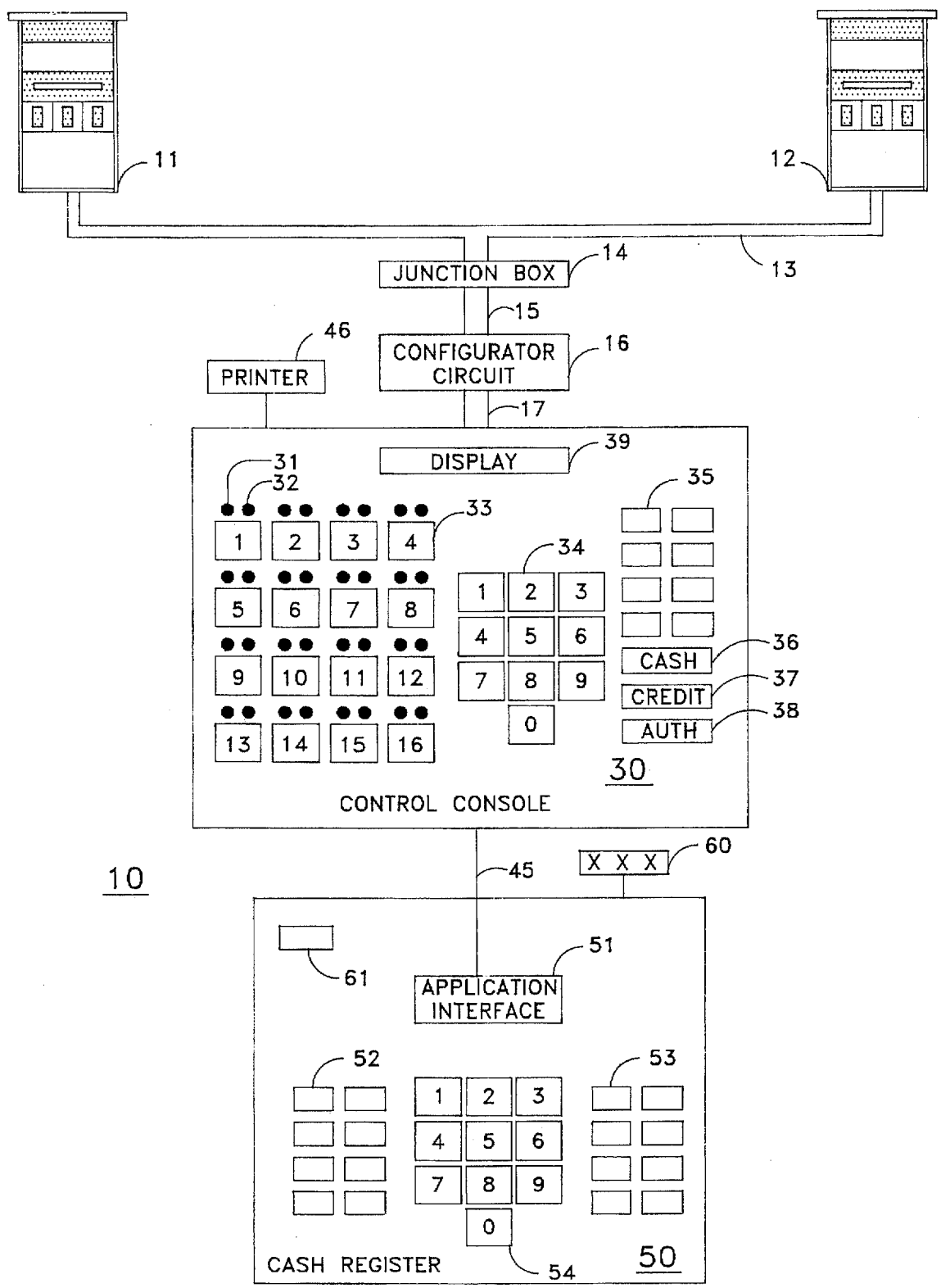
FIG. 1 is a schematic diagram of a fuel dispenser-cash register control console with electrical connections to fuel dispensers and cash register.

Referring now to the drawings, and first to FIG. 1, there is shown a schematic overview of a fuel dispenser control system, generally designated (10), which includes a fuel dispenser-cash register control console (30) electrically connected to fuel dispensers (11,12) and to a cash register (50). The console (30) is connected to the dispensers (11,12) through a configurator circuit (16) at the pump junction box (14). The console (30) controls the dispensing process at the dispensers (11,12) by sending data signals (commands) to dispensers, and the dispensers, in turn, sending data signals (responses) to the control console (30). The console (30) is connected to the protocol translator circuit, or configuration circuit (16) by cable (17), and the configuration circuit (16) is connected to the pump junction box (14) by cable (15). The pump junction box (14) provides a common electrical connection for all dispensers in the communication loop, which in the illustration is formed by data wire (13). As later discussed, the configuration circuit (16) configures the communication protocols so that the control console (30) can communicate with the dispensers (11,12). There can be several dispensers in the communication loop, and the dispensers may be single product, dual product, or multi-product dispensers.

The control console (30) has a number of input key switches for initiating commands to the dispensers (11,12). In the illustrative example, there are sixteen pump control keys (33) for selecting a dispenser, therefore, the console can control up to sixteen fueling positions. The number sixteen is illustrative only, other numbers are possible. The console (30) sends commands to the dispensers (11,12), and the dispensers send responses to the console. Commands from the console to the dispensers include price per gallon to be charged at the dispensers, preset amounts of fuel to be dispensed, and dispenser authorization (an activated mode whereby fuel will be dispensed if the customer opens a nozzle valve). Responses are, in turn, generated at the dispensers and sent to the console including pump number, pump status, and dispensed fuel volume and value for the pump.

There are integer input keys (34) for entering information such as preset amounts of fuel to be dispensed, programming modes, and related. There is an authorize key switch (38) for authorizing the dispensers, a cash key (36) and a credit key (37) for completing or paying out a sale. There are console control input keys (35) for entering information such as pump stop, toggle sales, and related. The LEDs (31,32) indicate to the store clerk customer activity at the dispensers, for example, a customer is requesting service, or he has completed fueling. Display (39) displays dispenser information according to the pump control keys (33), for example, the amount of fuel dispensed, a cash or credit sales, and related.

During a fueling transaction, a customer pulls his vehicle along side a dispenser. The customer removes the nozzle (not shown) and inserts it in the fuel tank. When the nozzle is removed from the dispenser, an LED (31) on the console (30) blinks indicating to the attendant in the store that a customer wants service. The attendant authorizes the dispenser by pushing the appropriate pump control key (33) and the authorize key (38). As fuel is dispensed, response data is generated at the dispenser and sent to the console (30). When the customer is finished and places the nozzle back on the dispenser, the other LED (32) blinks. The attendant pushes the appropriate pump control key (33) and the cash (36) or credit key (37) depending on how the customer wishes to pay for the fuel. The volume and value of the fuel dispensed is displayed on the console display (39) so the clerk can collect for the fuel. The dollar value and volume of fuel dispensed is stored in memory in the console (30).

There are two methods by which information on the fueling transaction can be transferred to a cash register. The clerk can read the information from the console display (39) and key it into the cash register, or this information can be automatically down-loaded. A feature of the present invention is that when the fueling transaction is paid out by the console (30), information on the transaction is transferred to the cash register (50). There is a serial connection between the console (30) and cash register (50) through cable (45). The console (30) is interfaced to the register (50) through an application interface (51). As later discussed, the console (30) sends to the cash register (50) a character string which mimics a register keyboard entry. By this method, the console could be interfaced to any number of commercially available register systems.

Cash registers are widely used in the retail industry to keep record of transactions and cash. Typically, there are integer input switches (54) for entering information such as dollar amounts, quantities, etc., department keys (52) for tracing merchandise sold from a department, and register function keys (53). There is a customer display (60) to show the amount of the purchase. There is also a register printer (61) for printing a receipt.

The console (30) is programmed to store in memory information on the amount of fuel dispensed from each fueling position. This information can be printed from a printer (46) including dispenser totals, shift totals, and station totals. Any number of commercially available printers can be used to print these reports. Dispenser totals are obtained by the console polling the processor in the dispenser; shift totals are resettable totals which are calculated and stored by the console and reset at each shift change; and station totals are resettable totals of fuel dispensed for the station over a longer period of time.

Figure 2:
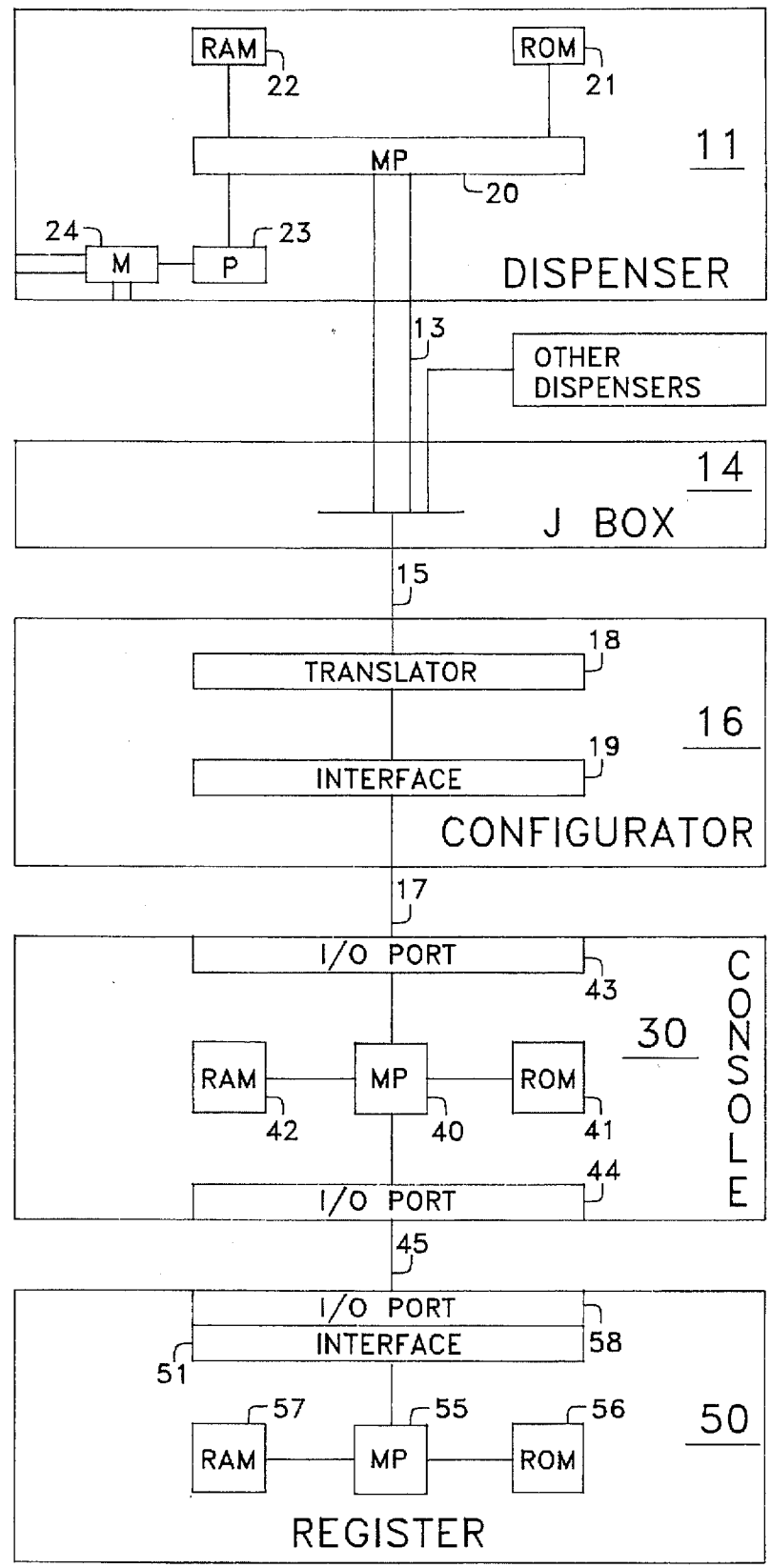
FIG. 2 is a block diagram illustrating the functional components of the dispenser-cash register control console.

Referring now to FIG. 2, there is shown a block diagram of how the components of the system function together. First the fuel dispenser, generally designated (11). Fuel dispensers are widely used in the petroleum retail industry to dispense fuel. Generally, a fuel dispenser includes a pump, a flowmeter (24) with pulser (23), and a fuel supply hose with nozzle. The pump is connected at one end to a fuel supply tank, and at other end to a flowmeter through a pipe. As fuel is being dispensed, the flowmeter (24) measures the quantity of fuel, and the pulser (23) generates a flow quantity signal from the flowmeter. When the nozzle valve is opened, fuel flows though the flowmeter into the fuel supply hose and nozzle into the vehicle tank. The pulser (23) generates a flow quantity signal which is sent to a MP (20) in the dispenser head. The dispenser MP (20) is coupled to ROM chip (21) and a RAM chip (22) for calculating, displaying, and storing in memory information on fuel dispensed. The pump, flowmeter (23) with pulser (23), supply hose with nozzle, and MP (20) with ROM (21) and RAM (22) constitute a fuel dispensing means.

A feature of the present console (30) is that it has the ability to control different dispenser brands in the communication protocol unique to the dispenser brand. This is accomplished by the configuration circuit (16) which is in effect a protocol translator circuit. As discussed above, electronic dispensers have a MP (20) with ROM (21) and RAM (22) for controlling the dispensing process and communicating with the dispenser controller. Certain dispenser brands use current loop communication for communicating with the controller while others use voltage level communication, still others use a combination thereof. The configuration circuit (16) is, in essence, a circuit for translating communication protocols. With dispensers using current level communication, it is a current translator which uses a opto-coupler for translation; with dispensers using voltage level communication, it is a voltage translator which uses a comparator for translation. Interface circuits (18) allow the console (30) to communicate in either voltage levels or circuit levels. Reference is made to the above referenced related patents for further discussion of the configuration circuitry.

The console (30) is connected to the configurator (16) through I/O port (43) and cable (17). The console (30) includes MP (40) which coupled to ROM (41) and RAM (42). These chips are commercially available, Zilog Z80 being an example for the MP. The MP (40) is coupled to the various input key switches shown in FIG. 1 and previously discussed. Commands for controlling the dispensers are stored in ROM (41), and responses from the dispensers are calculated by RAM (42). The MP (40), the ROM (41), the RAM (42), the I/O ports (43,44), and the input keys shown in FIG. 1 constitute a control console means.

The console (30) is programmed to allow the manager to configure the console for the specific type operation desired and to retrieve stored information. Management information is protected by use of a manager PIN code, which is changeable through a programming mode. Other programming modes include: Pump Setup Information, which includes assignment of hoses per fueling position, and blend ratios; Product Information, which includes product name, cash price per unit, and credit price per unit; Beeper Setting, which includes a single or continuous beeps for handle, collect, and drive away; Clock and Calendar, which includes setting the time and date; Serial Port Configuration, which includes selecting the baud rate; Peripheral Devices, which enables devices connected to the serial port; Print Header, which includes setting the printer header for the printer receipt; Read Reports, which includes generating and displaying totals reports; Print Reports, which includes printing totals reports; and Clear Resettable Totals, which includes resetting resettable totals.

As previously stated, the present invention allows one to down-load fuel sales information to a cash register when the fueling transaction is paid out on the console. This is achieved by the MP (40) in the console generating and sending to the MP (55) in the cash register (50) a character string which mimics a cash register keyboard entry through an application interface. The messages are sent to the register by way of an RS232 serial input connection. The data format is 9600 baud, 8 data bits, no parity, 1 stop. The MP (55), the ROM (56), the RAM (57), I/O port (59), and the input key switches shown in FIG. 1 constitute a cash register means. The application interface means is as discussed below.

An illustrative example of a message format as used in the application interface is as follows. In essence, the character string from the console (30) to the register (50) mimics a key stroke input on the cash register.

STX[key code] . . . [key code]CR[key count]ETX[check digit] STX is a message start character.

Key code is a sequence of ASCII characters representing decimal digits corresponding to a key function code.

CR is a carriage return character representing the end of key code sequence.

key count is one byte containing the count in hex of the number of key codes sent.

ETX is a character representing the end of the message string.

check digit is 1 byte which is the 2's complement of the XOR of every character in the message string including STX and ETX.

Another illustrative example of a message format (character string) used in the application interface to enter a refund to a department is as follows:

STX[return key][price][department]CR[key count]ETX [check digit]

Other data generated and stored in the console could be down-loaded to cash register in a similar manner. For example, there was previously discussed shift totals, dispenser totals, and resettable totals, reports generated by the console. These could be formatted and down-loaded in a similar manner to the register.

The fuel dispenser-cash register control console (30) uses a common communication protocol for communicating with different dispenser brands through the configuration circuit (16) which configures the communication protocol to different dispenser brands. Ten commands, with associated responses, are used to control the dispensers during the fueling process including: pump authorization, sale information, pump stop, pump resume, error, status request, reset, pump totals, price per unit, and blend commands. Commands are initiated through the previously discussed key switches on the control console (30). Reference is made to U.S. Pat. No. 5,270,943, having a common assignee and inventor, for further information on command structure.

Figure 3:
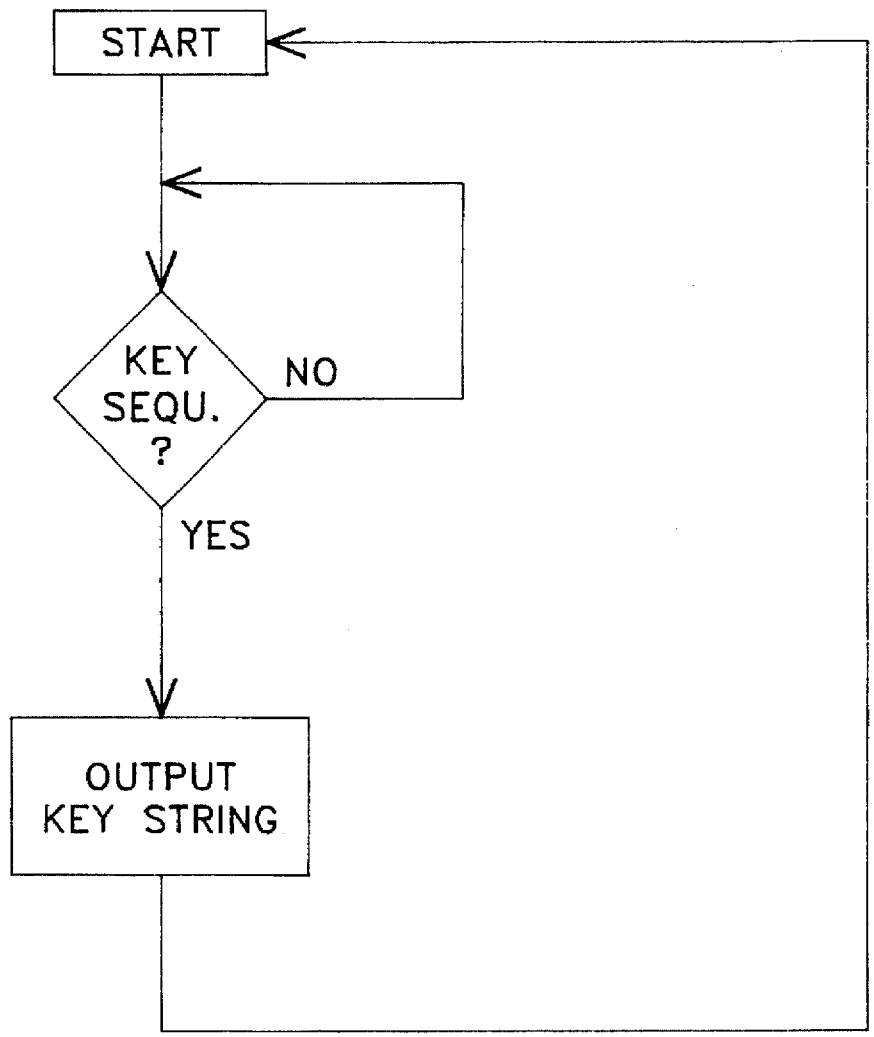
FIG. 3 is a flow chart illustrating the operation of the console-register and the application interface in down-loading information.

Referring now to FIG. 3, there is shown a flow chart for the application interface for down-loading sales information from the console (30) to the cash register (50). First, there is a key sequence decision block to check for key switch input in the console, i.e., cash paid or credit paid. When positive, a character string mimicking a cash register key stroke is sent.

In the preferred embodiment discussed thus far, sales information is down-loaded to a cash register when the sale is paid out on the console. In an alternate embodiment, information is down-loaded from the console to a PC. In the c-store industry, it is common practice to have a so-called "backroom" PC for managing inventory, recording fuel drops, employee records, and related. Often times these PC's have modem communication to corporate headquarters. A matter of interest to management is the amount of fuel sold. As previously stated, fuel shift totals, non-resettable fuel totals, resettable totals, and polled pump totals can be generated from information stored in memory of the console. This information can be down-loaded to the backroom PC through a serial connection, saving the site manager the time of manually entering this information into the PC.

Following is a generic Pump Totals Command used to read the totals for the requested fueling position and hose number by the PC from the console (30).

```
Command Format:
    STXIPump#Hose#FlagETXCD
        I                       =Command Character
        Pump#                   =Fueling Position
        Hose#                   =Hose Number
        Flag                    =Totals Type
Response:
    STXPump#Hose#FlagVVVVVVV.VVVXXXXXXXX.XXYYYYYYY.YYETXCD
        Pump#                   =Fueling Position
        Hose#                   =Hose Number
        Flag                    =Totals Type
        VVVVVVV.VVV             =Volume Totals
        XXXXXXXX.XX             =Credit Totals
        YYYYYYYY.YY             =Cash Totals
```

An application interface (see referenced U.S. Pat. No. 5,270,943 for a discussion of a driver) allows the flow of data between the console and PC. The flow of data could be on the fly, or the PC could poll the console at predetermined times. Once the data has been transferred to the PC, it can be formatted into a form compatible with the software program being used in the PC.

Figure 4:
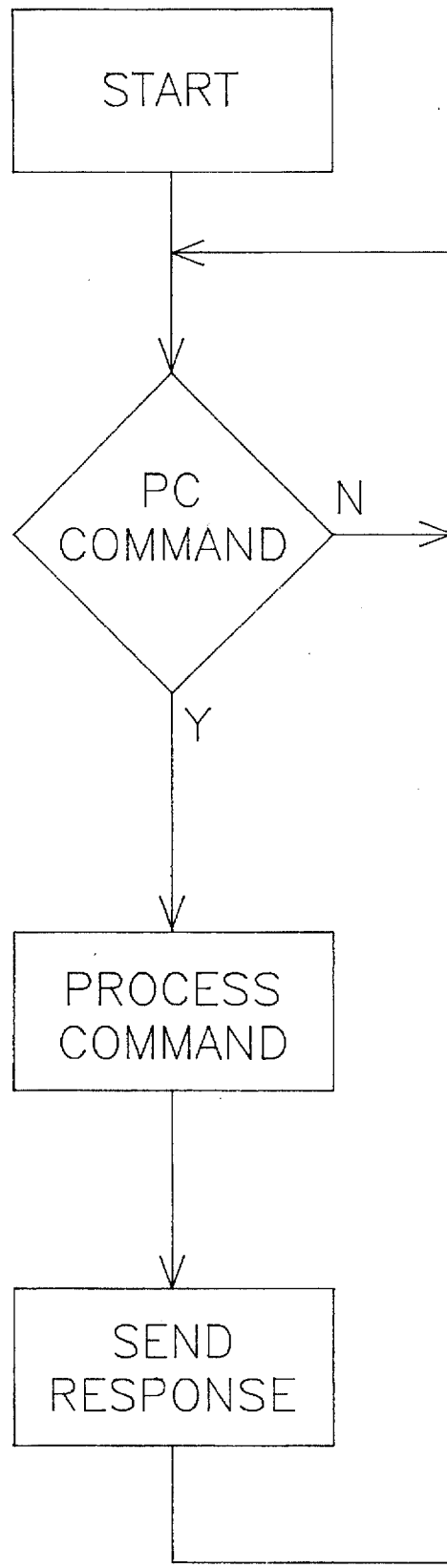
FIG. 4 is a flow chart illustrating the operation of the PC reading fuel totals from the console with command requesting information and the response to the command.

Referring now to FIG. 4, there is shown a flow chart for the operation of the PC reading totals from the console. First there is a decision block for determining when a totals command has been issued. When positive, the MP (40) processes the command, and generates and sends the response, previously discussed.

The following totals reports are generally generated by the console (30) and down-loaded to the PC.

1. Resettable Totals
2. Non-resettable Totals
3. Shift 0 Totals (current shift)
4. Shift 1 Totals
5. Shift 2 Totals
6. Shift 3 Totals
7. Polled Pump Totals The type Totals report generated by the console and down-loaded to the PC depends on the Flag in the Command Format and Response as previously discussed.

The present invention may, of coarse, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced within.

What is claimed is:

1. A fuel dispenser-cash register control system for controlling the dispensing process in at least one fuel dispenser, for storing in memory information on the amount of fuel dispensed from said dispenser, and for transferring information on each dispensing transaction to a designated department in a cash register when the sale is paid out on the console, comprising:

(a) a control console means having a first programmable micro processor coupled with a first read-only-memory device and a first read-and-write-memory device, and a series of console input key switches, for;
  (1) controlling said dispenser from said console input key switches causing said first microprocessor to retrieve dispenser control commands from said first read-only-memory device in a predetermined sequence and output said commands to said fuel dispenser causing said dispenser to dispense fuel;
  (2) receiving dispenser responses from said dispenser during the fueling process and storing said responses in said first read-and-write-memory device;
  (3) generating and transferring to said cash register a character string containing information on the dispensing transaction when the transaction is paid out on said console means;

(b) an application interface means between said first microprocessor in said control console means and a second microprocessor coupled with a second read-only-memory device and a second read-and-write memory device in said cash register for,
  (1) generating and sending by said first microprocessor in said control console a character string which mimics a keyboard entry in said cash register, and
  (2) receiving and processing said character string by said second microprocessor in said cash register causing the sale to be posted in a department;

(c) a configuration means having electrical connection to said control console means and said fuel dispenser for
  (1) configuring said dispenser control commands into a communication protocol readable by said fuel dispenser, and
  (2) configuring said dispenser responses into a communication protocol readable by said control console means.

2. A fuel dispenser-cash register control system as defined in claim 1, wherein said configuration means includes an opto-coupler with light emitting diode and transistor for translating current levels.

3. A fuel dispenser-cash register control system as defined in claimed 1, wherein said configuration means includes a comparator for translating voltage levels.

4. A method for controlling the dispensing process in a fuel dispenser delivering fuel to a vehicle by a fuel dispenser-cash register control console means which downloads sales information on the fuel dispensed from said dispenser to a cash register means at completion of the fueling transaction through an application interface means, comprising the steps of:

(a) setting the price per unit of the fuel to be dispensed by a price command from said console means to said dispenser;
(b) authorizing said dispenser with an authorization command from said console means allowing said dispenser to dispense fuel;
(c) polling the status of said fuel dispenser by a status request command from said console means to determine if dispenser is idle, if the nozzle handle has been lifted and service is being requested at dispenser, or if dispenser is dispensing fuel;

(d) reading sales information at said dispenser by a sales information command from said console means where in turn said dispenser responds with the dollar and volume amount of fuel dispensed;

(e) down-loading from said console means said sales information to said cash register through said application interface means wherein said console means sends to said cash register means a character string which mimics a cash register key stroke; and (f) posting in a designated department said sales information by said cash register means as a sale.

5. A fuel dispenser control system for controlling the dispensing process in at least one fuel dispenser, for storing in memory information on the amount of fuel dispensed from said dispenser, and for down-loading said information on the amount of fuel dispensed to a PC at request, comprising:

(a) a control console means having a first programmable data processor coupled with a first read-only-memory device and a first read-and-write-memory device, and a series of console input key switches, for;

(1) controlling said dispenses from said console input key switches causing said first data processor to retrieve dispenser control commands from said first read-only-memory in a predetermined sequence and output said commands to said to said fuel dispenser causing said dispenser to dispense fuel;

(2) receiving dispenser responses including pump totals from said dispenser during the fueling process and storing said totals in said first read-and-write-memory device;

(3) generating and down-loading to said PC fuel totals reports;

(b) an application interface means between said first data processor in said console means and a second data processor couple to a second read-only-memory device and a second read-and-write-memory device in said PC for, (1) allowing for the flow of data between said console means and said PC, and (2) reading said totals reports from said console means by said PC;

(c) a configuration means with electrical connection to said console means and said fuel dispenser; for (1) configuring said dispenser control commands into a communication protocol readable by said fuel dispenser, and (2) configuring said dispenser responses into a communication protocol readable by said control console means.

6. A fuel dispenser control system as defined in claim 5, wherein said configuration means includes an opto-coupler with light emitting diode and transistor for translating current levels.

7. A fuel dispenser control system as defined in claim 5, wherein said configuration means includes an comparator for translating voltage levels.

8. A method for controlling the dispensing process in at least one fuel dispenser delivering fuel to a vehicle by a fuel dispenser control console means which stores in memory information on the amount of fuel dispensed by fueling position and hose number, and down-loads said information to a PC through an application interface means, comprising the steps of:

(a) setting the price per unit of the fuel to be dispensed by a price command from said console means to said dispenser;

(b) authorizing said dispenser with an authorization command from said console means allowing said dispenser to dispense fuel;

(c) polling the status of said fuel dispenser by a status request command from said console means to determine if said dispenser is idle, if the nozzle has been lifted and service is being requested, or if dispenser is dispensing fuel;

(d) reading sales information at said dispenser by a sales information command from said console means where in turn said dispenser responds with the dollar and volume amount of fuel dispensed which is stored in memory as pump totals;

(e) generating by said console means from said pump totals pump totals reports at request of said PC through said application interface means;

(f) down-loading from said console means to said PC said pump totals reports through said application interface means.

9. The method as defined in claim 8, wherein step (e) is practiced by generating a resettable totals report.

10. The method as recited in claim 8, wherein step (e) is practiced by generating a non-resettable totals report.

11. The method as recited in claim 8, wherein step (e) is practiced by generating a shift 1 totals report.

12. The method as recited in claim 8, wherein step (e) is practiced by generating a shift 2 totals report.

13. The method as recited in claim 8, wherein step (e) is practiced by generating a shift 3 totals report.

14. The method as recited in claim 8, wherein step (e) is practiced by generating a polled pump totals report.

* * * * *